United States Patent
Assmann et al.

(10) Patent No.: US 7,100,623 B2
(45) Date of Patent: Sep. 5, 2006

(54) DISHWASHER HAVING SPRAY ARMS AND A CIRCULATION PUMP

(75) Inventors: Walter Assmann, Bielefeld (DE); Ulrich Hettenhausen, Bielefeld (DE); Volker Marks, Bielefeld (DE)

(73) Assignee: Miele & Cie. KG, Guetersloh (DE)

( * ) Notice: Subject to any disclaimer, the term of this patent is extended or adjusted under 35 U.S.C. 154(b) by 268 days.

(21) Appl. No.: 10/482,979

(22) PCT Filed: Jul. 3, 2002

(86) PCT No.: PCT/EP02/07347

§ 371 (c)(1),
(2), (4) Date: Jan. 6, 2004

(87) PCT Pub. No.: WO03/005875

PCT Pub. Date: Jan. 23, 2003

(65) Prior Publication Data

US 2004/0173249 A1    Sep. 9, 2004

(30) Foreign Application Priority Data

Jul. 7, 2001   (DE) ................................ 101 33 130

(51) Int. Cl.
*B08B 3/00*   (2006.01)
*F04B 19/00*  (2006.01)

(52) U.S. Cl. .................. 134/184; 134/56 D; 134/56 R; 134/188; 415/148; 415/150; 415/146; 415/911; 137/625.11

(58) Field of Classification Search ................ 415/148, 415/150, 911; 134/184, 188, 56 D
See application file for complete search history.

(56) References Cited

U.S. PATENT DOCUMENTS

| | | | | |
|---|---|---|---|---|
| 3,583,826 A | * | 6/1971 | Schonwald et al. ......... | 415/143 |
| 3,705,602 A | * | 12/1972 | Nordin et al. .............. | 137/512 |
| 3,807,444 A | * | 4/1974 | Fortune .................... | 137/512.1 |
| 4,091,644 A | * | 5/1978 | Bochan ...................... | 68/18 F |
| 4,417,851 A | * | 11/1983 | Cygnor et al. .............. | 415/150 |
| 4,467,627 A | * | 8/1984 | Platt et al. .................. | 68/17 R |
| 4,679,983 A | * | 7/1987 | Pietryk et al. .............. | 415/148 |
| 4,730,630 A | * | 3/1988 | Ranft ......................... | 134/111 |
| 5,331,986 A | * | 7/1994 | Lim et al. .................... | 134/88 |
| 6,601,593 B1 | * | 8/2003 | Deiss et al. ................. | 134/25.2 |
| 6,634,224 B1 | * | 10/2003 | Schob et al. ................. | 73/168 |
| 2002/0007843 A1 | | 1/2002 | Deiss et al. ................. | 134/25.2 |

FOREIGN PATENT DOCUMENTS

| DE | 2114978 | 10/1972 |
|---|---|---|
| DE | 7514342 | 10/1975 |
| DE | 3810648 | 10/1989 |
| DE | 8816597 | 2/1990 |

(Continued)

*Primary Examiner*—Michael Barr
*Assistant Examiner*—Sarah E. Husband
(74) *Attorney, Agent, or Firm*—Darby & Darby (57) ABSTRACT

A dishwasher includes a number of spray arms, a circulation pump with a pump housing, an impeller, a suction port, and a number of discharge ports on the pump housing. The discharge ports are associated with the spray arms. A water diverter is located on a delivery side of the pump and generates a flow leading from the suction port selectably to one or more of the discharge ports. The water diverter includes a blocking element having a number of diaphragm openings positionable to one or more outlet positions by a drive via a rotation of the blocking element in a circumferential direction.

23 Claims, 6 Drawing Sheets

FOREIGN PATENT DOCUMENTS

| | | |
|---|---|---|
| DE | 4418153 | 11/1995 |
| DE | 19852569 | 5/2000 |
| DE | 19857103 | 6/2000 |
| EP | 0585905 | 3/1994 |
| EP | 0795292 | 9/1997 |
| EP | 0795292 A2 * | 9/1997 |
| GB | 771562 | 4/1957 |
| WO | 0158335 | 8/2001 |

* cited by examiner

DISHWASHER HAVING SPRAY ARMS AND A CIRCULATION PUMP

The present invention relates to a dishwasher with spray arms and with a circulation pump, having an impeller, a suction port and at least one discharge port on the pump housing, with a water diverter provided on the delivery side of the pump in order to generate a flow leading from an inlet to one of several selectable outlets associated with the spray arms, whereby the water diverter has a blocking element with at least one diaphragm opening that can be positioned by a drive in at least one outlet position.

BACKGROUND

The circulation pumps employed in devices through which water flows, particularly for conveying washing water in dishwashers used in households or in industry, are normally centrifugal pumps which are mounted at the bottom of the washing tub. Such a pump serves to circulate the washing solution by pumping it out of the washing tub and then back into it again through the spray arms of the system and over the items to be washed. In this context, for purposes of achieving economical and energy-saving operation, it is a generally known procedure to regulate the feed of washing solution to the spray arms as a function of the load in the dish rack in the washing tub and/or as a function of the program set for the type of items to be cleaned. Thus, for instance, it is common practice for the washing or cleaning solution that is circulated by the dishwasher's built-in circulation pump to be alternately fed to the spray arms associated with the dish racks or else for certain spray arms to be disconnected from the supply of washing water, for instance, the lower spray arm when the lower rack is not loaded.

Switching to one spray arm or another or else completely closing the water conduits in the washing system is regulated in a known manner as a function of a program by a so-called water diverter (see German utility model DE 88 16 597 U1) located downstream from the delivery side of the circulation pump.

In the case of a circulation pump that has only one discharge port that branches off to the upper and the lower spray arm feed lines downstream from the pump, it is common practice to arrange the water diverter in the branching-off point so that the water diverter then supplies either the upper, the lower or else both spray arms with washing solution as a function of the cleaning program that has been pre-selected. If there are, for example, three or more spray arms of which at least one is always supposed to be supplied with washing solution, then the water diverter can also be arranged in a branched-off spray arm feed line as an additionally switchable line branch.

Moreover, German utility model DE 75 14 342 U1 discloses a pump that is connected via its discharge ports to hydraulic aggregates such as, for example, a control cylinder, a venting mechanism, an admixer, etc. A shut-off device is provided so that the connected aggregates can be switched off. The shut-off device has plate-like blocking elements that are affixed to a bracket. The bracket with its blocking elements is arranged in the pump chamber and can be moved in the circumferential direction by means of a manual lever provided outside of the pump in order to close or open the discharge ports, whereby the blocking elements are arranged in such a way that either all of the discharge ports are open or all of them are closed.

DE 211 4978 describes a pump having blocking elements arranged in its pump chamber, said elements being connected to each other by means of a bracket. The blocking elements, preferably two, are each located upstream from a discharge port provided on the circumference. By means of a rod, which is connected to a blocking element and which protrudes from a bore in the pump housing, the blocking element can be pushed into the pump chamber so that the corresponding discharge port can be opened, while the blocking element closes off the corresponding discharge port on the other side of the bracket.

SUMMARY OF THE INVENTION

Before the backdrop of the above-mentioned state of the art, it is an object of the present invention to provide a flow system—consisting of the water diverter and the pump system—of a dishwasher of the afore-mentioned type in such a way that it achieves a high degree of hydraulic efficiency.

The present invention provides a dishwasher wherein the water diverter is integrated into the circulation pump in such a manner that the inlet of the water diverter is formed by the suction port of the circulation pump and the outlet of the water diverter is formed by several discharge ports of the circulation pump and that the geometry and the arrangement of the blocking element in the circulation pump are such that the desired outlet position is reached by rotating the blocking element in its circumferential direction.

This brings about the advantage that the design and dead volume of the circulation pump, combined with that of the water diverter, is almost the same as in a circulation pump without a water diverter. Accordingly, it becomes possible to save construction space in this already crowded device and to increase the degree of hydraulic efficiency in the device. Furthermore, there is no need for connecting lines between the pump and the water diverter. Turning the blocking element in its circumferential direction does not generate strong forces since the direction of rotation is not opposite to the pump pressure. For this reason, in an advantageous manner, the water diverter can be made of relatively inexpensive materials whose strength requirements are low.

In an advantageous embodiment, the diaphragm openings of the blocking element and the openings of the discharge ports are selected in such a way that the cross-sectional areas of all of the discharge ports opened by the blocking element remain constant in total, even while the blocking element is being turned to one of the outlet positions. Since the cross-sectional areas remain constant, the pump delivers a constant circulation volume, thus preventing air from being sucked in, which would lead to foam formation and, in turn, be detrimental for the washing results. Moreover, the fact that the circulation volume remains constant keeps the noise level constant during operation.

According to another advantageous embodiment of the invention, the blocking element is shaped like a pot with a bottom or is shaped like a ring without a bottom and is situated on the encircling blocking element wall. Such a geometry for the blocking element is particularly advantageous because this accounts for an unimpeded flow to the discharge port or ports.

Due to the advantageous embodiments of the invention, especially due to the blocking element arranged in the pressure chamber of the pump upstream from the branching-off discharge ports, the number of diverter positions of the water diverter for blocking or opening the discharge ports for the washing solution can also be varied in a simple manner. The blocking elements are reliably adjusted and securely fixed in place in the appertaining water diverter position by means of the drive for the blocking element located outside or inside the pressure chamber, said device being advantageously realized in the form of an electric motor and toothed gears provided on the outside of the pump housing. A circulation or centrifugal pump configured in this manner can also be advantageously employed anywhere—in other words, outside of the realm of dishwashers and washing machines—that water conduits of a water distribution system have to be supplied with liquid, individually, alternately, or simultaneously. The circulation pumps according to the present invention can be used universally, particularly also separately in heating engineering.

BRIEF DESCRIPTION OF THE DRAWINGS

Embodiments of the invention are depicted in the drawings and will be described in greater detail below. The drawings show, respectively, the following.

DETAILED DESCRIPTION

Figure 1:
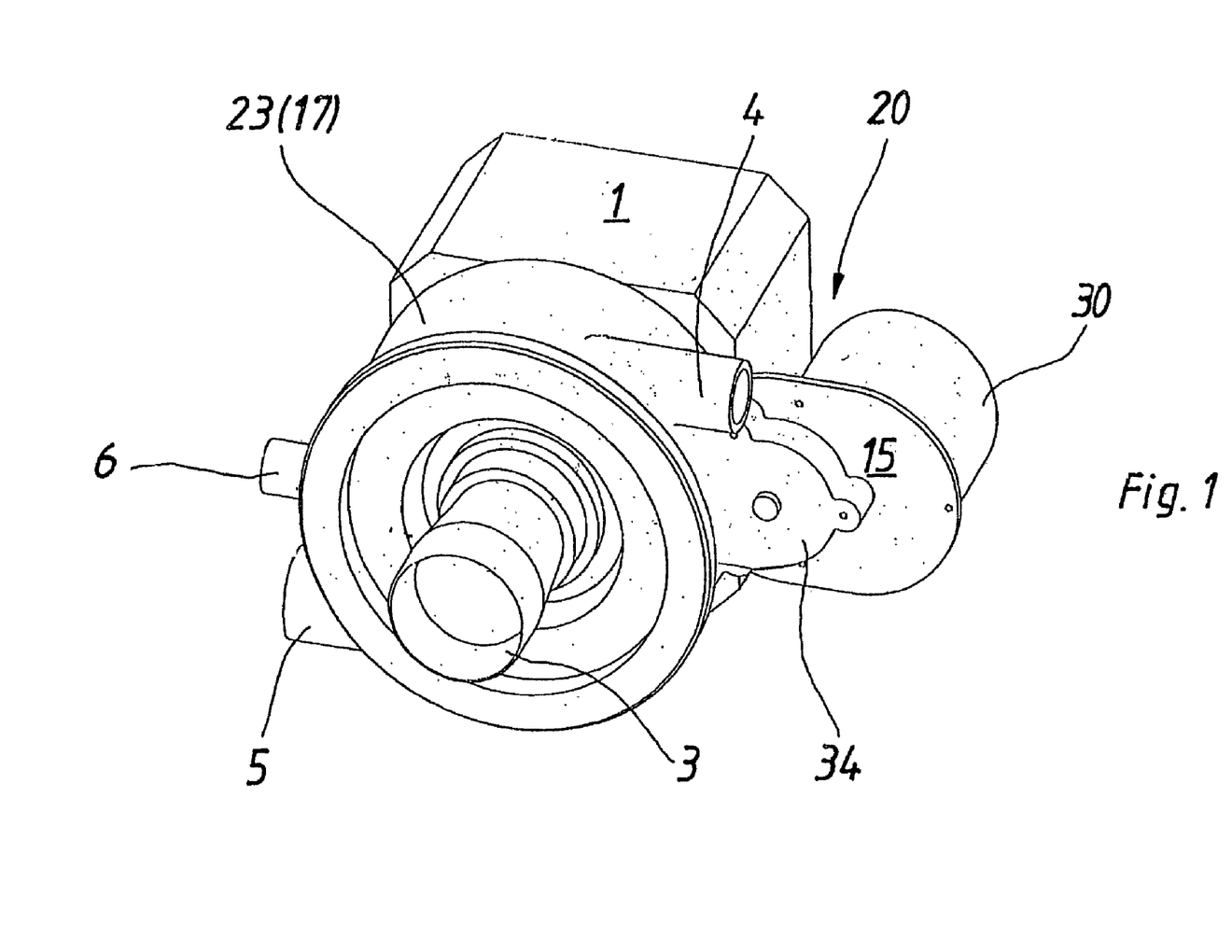
FIG. 1 a circulation pump, especially for use in dishwashers, with a suction port, three discharge ports and an integrated water diverter, in a perspective view.
Figure 2:
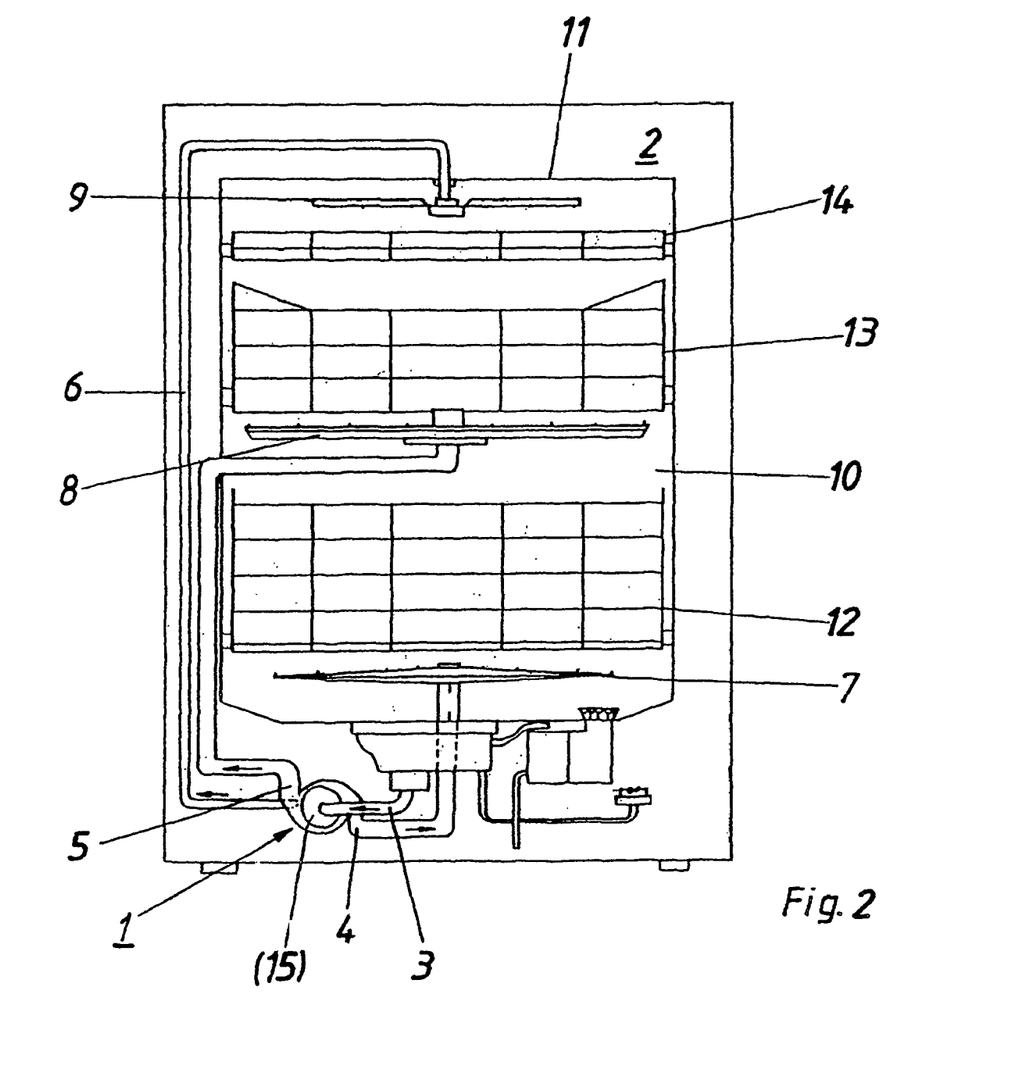
FIG. 2 the circulation pump installed in the washing water system of the schematically depicted dishwasher.

A circulation pump (1) depicted in FIG. 1, especially for a dishwasher (2), see FIG. 2, has a suction port (3) for washing solution and three separate discharge ports (4, 5, 6) on the pump housing (23), which are to be connected to the associated spray arm feed lines so that the spray arms (7, 8, 9) of the dishwasher (2) schematically shown in FIG. 2 can be filled with the washing solution.

By means of the circulation pump (1) configured as a centrifugal pump, the washing solution in the dishwasher (2) is circulated by pumping it out of the washing tub (10) and then back into it again via the three spray arms (7 to 9) of the system and over the items to be washed. Here, each spray arm (7, 8 or 9) is associated with a separate discharge port (4, 5 or 6) of the circulation pump (1). Thus, for example, the spray arm (7) associated with the lower rack (12) is supplied with washing or cleaning solution by the discharge port (4) while the upper rack (13) for dishes is supplied by the discharge port (5). The upper spray arm (9) installed on the washing tub ceiling (11) of the dishwasher (2), in contrast, is supplied by the third discharge port (6) of the circulation pump (1). This separate spray arm is associated with a flat rack (14) for cutlery arranged in the top washing level of the washing tub (10). Corresponding spray arm feed lines establish the connection between the discharge ports (4 to 6) and the spray arms (7 to 9).

In order for the dishwashing operation to be cost-efficient and energy-saving, the program can regulate the feed of washing solution to the spray arms (7 to 9) as a function of the load in the dish racks in the washing tub and/or as a function of type of items to be cleaned. This can be regulated in such a way that the rinsing or cleaning solution being circulated is alternately fed to the spray arms (7 to 9) associated with the different racks, or else a certain spray arm (7, 8 or 9) of the dishwasher (2), for instance, the lower spray arm (7), is disconnected from the supply of washing water when the lower rack (12) is not loaded, that is to say, the feed of washing water to the discharge port (4) provided for that purpose is interrupted. Switching over to one spray arm or another (7, 8 or 9) or completely closing the water conduits during a given dishwashing cycle is effectuated as a function of the program by a water diverter (15) that is integrated according to the invention into the circulation pump (1). In this context, see FIGS. 2 to 10, especially FIG. 6.

A selected dishwashing program which dries the dishes comprises cold-water dishwashing cycles (pre-rinsing, intermediate rinsing) and hot-water cycles (cleaning, clear-rinsing) whereby, depending on how dirty the dishes are, parts of the program can be added or skipped, for example, the pre-rinse or the intermediate rinse. During the hot-water cycles, the washing or cleaning solution circulating in the washing tub (10) is heated up by the dishwasher's built-in heater. The heater can be configured as a separate instantaneous water heater inside or outside of the washing tub (10), or else it can be integrated into the circulation pump (1). The latter model is shown in FIG. 5 and it advantageously reduces the amount of space that needs to be made available in the device. The description below deals with the arrangement and configuration of the components of the water diverter (15) according to the invention in a circulation pump (1) as shown in FIGS. 3 to 10, whereby a circulation pump (1) with an integrated heater (16) according to FIG. 5 is also employed.

Figure 3:
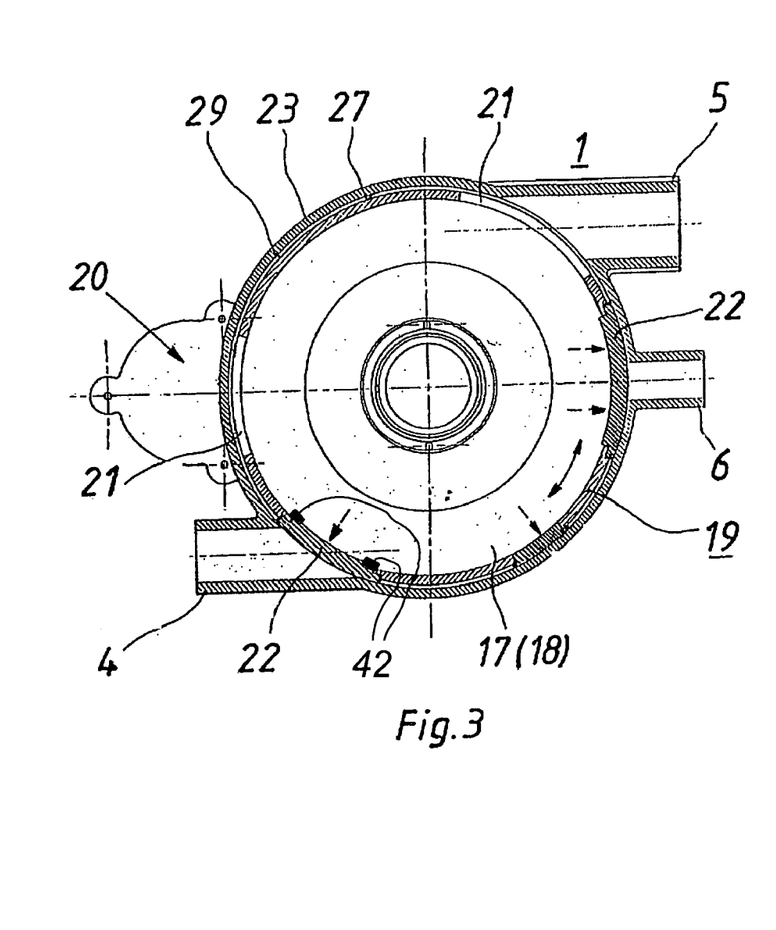
FIG. 3 the open circulation pump in a top view with the blocking element of the water diverter arranged in the pump chamber.
Figure 6:
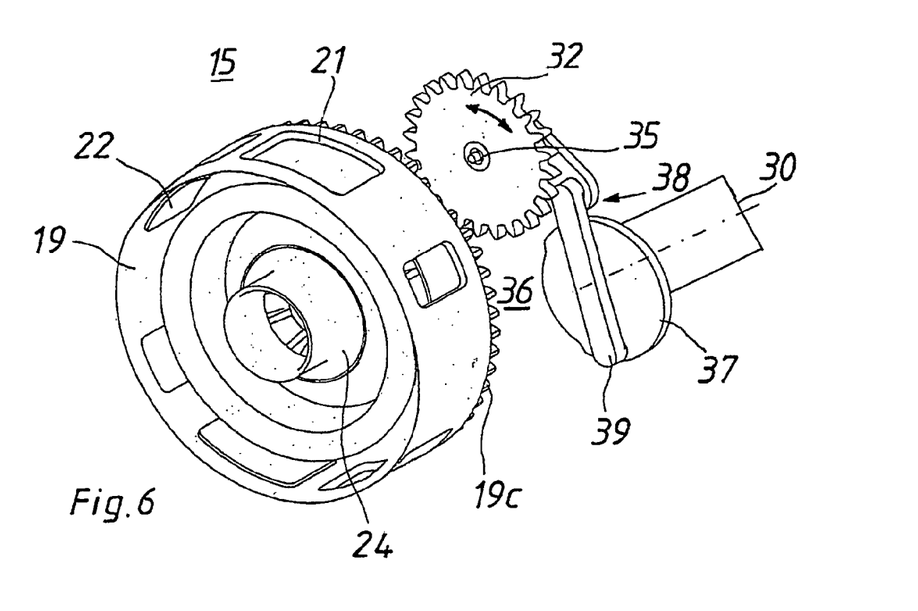
FIG. 6 the blocking element operationally connected to a gear of the water diverter drive.

According to FIGS. 3 and 6, the water diverter (15) consists of a blocking element (19) that serves to close or open the discharge ports (4, 5, 6) for the washing solution and that is arranged in the pump chamber (17), especially in the pressure chamber (18) of the pump, upstream from the branching-off discharge ports (4, 5, 6), and it also consists of a drive (20) for the blocking element (19), preferably located outside of the pressure chamber (18). FIG. 3 illustrates this for the circulation pump (1) described in FIG. 1, whose pump chamber (17) is shown in the open position. The top view shows the arrangement of the blocking element (19) in the pump pressure chamber (18). It is likewise possible to place the drive (20) in the pump chamber, as will be described in greater detail in a passage below.

Figure 4:
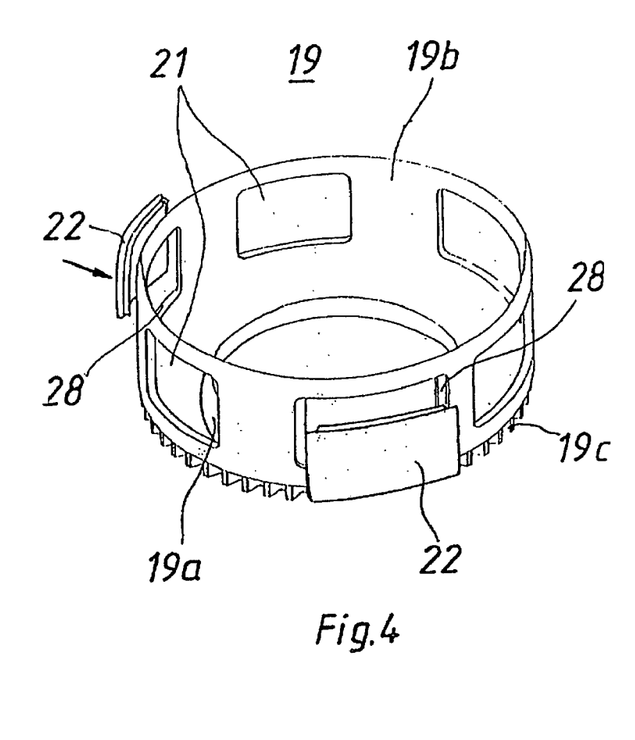
FIG. 4 the blocking element with openings and closure elements for the discharge ports, in a perspective view.
Figure 5:
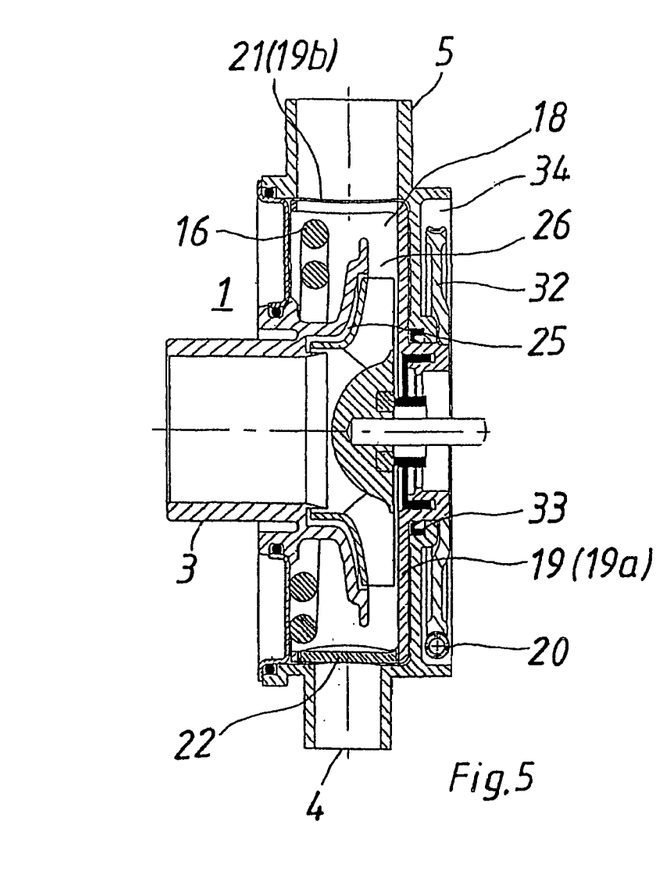
FIG. 5 the circulation pump with an integrated water diverter consisting of the blocking element and of a drive, according to a first embodiment, in a longitudinal section.

According to FIG. 4, the blocking element (19), which is mounted on bearings so that it can rotate in the pump chamber (17), is designed with one or more diaphragm openings (21) between one or more moveable closure elements (22) which function like valves for the program-controlled blocking of the discharge ports (4 to 6) so that said discharge ports (4 to 6) can be selectively opened. The closure elements (22) are provided on the blocking element (19) between the diaphragm openings (21) corresponding to the prescribed distribution of the discharge ports on the pump housing (23) and corresponding to the selectable connection of the ports to the washing water circulation system. The direction of rotation of the blocking element (19) can preferably be reversed; also see the arrows in FIGS. 3 and 6. There can also be fewer than (for instance, two) or more than three discharge ports on the circulation pump (1). FIG. 3 shows the blocking element (19) in a rotational position in which only the discharge port (5) for the middle spraying arm (8) is open. This is a program variant in which only the upper rack has been loaded with items to be washed. Since all of the other racks are empty, their appertaining spray arms (7, 9) or discharge ports (4, 6) do not need to be opened. In contrast, both discharge ports (4, 6) have been opened in FIG. 9, so that dishwashing takes place at the top and at the bottom. Therefore, the activation of the discharge ports can be selected on the basis of the arrangement of the closure elements.

The circulation pump (1) on the basis of FIG. 3 with the integrated water diverter (15) according to the invention has a circular pump chamber (17) that rotation-symmetrically encircles the impeller (24) of the circulation pump (1)—not shown in FIG. 3. Advantageously here, this chamber—see FIGS. 5 or 8—is divided into a flow-intensive impeller chamber (25), into a vaneless ring diffuser chamber (26) located downstream, as well as into a pressure chamber (18) located downstream from the diffuser. This pressure chamber (18) is flow-steadied. The discharge ports (4 to 6) of the circulation pump (1) branch off from this pressure chamber (18). The chamber also accommodates the blocking element (19) of the water diverter (15) that is formed like a pot, having a bottom (19a), matching the circular shape of the pump chamber (17), and an encircling blocking element wall (19b); in this context, see FIGS. 5 and 8. The blocking element (19) plunges virtually form-fittingly into the pressure chamber (18), whereby the diaphragm openings (21) as well as the moveable closure elements (22) are configured on the blocking element circumference, adjacent to the wall of the pressure chamber (27). If the circulation pump (1) is additionally equipped with a heater (16) according to FIG. 5, then said heater is advantageously likewise present in the flow-steadied pressure chamber (18) upstream from the blocking element wall (19b).

The closure elements (22) according to FIG. 4 are loose parts that can be separately inserted form-fittingly into the appropriate openings (28) in the blocking element wall (19b) and they are each placed from the outside (see FIG. 5) into the appropriate openings (28) along the blocking element circumference. The closure elements (22) each have an encircling edge that extends somewhat beyond the associated opening (28) when the closure element (22) has been put in place. The encircling edge (see FIG. 3) prevents the inserted closure element (22) from falling inwards into the blocking element (19). If the blocking element wall (19b) were to have an appropriate cutout, it would likewise be possible to insert the closure elements (22) from above.

Figure 9:
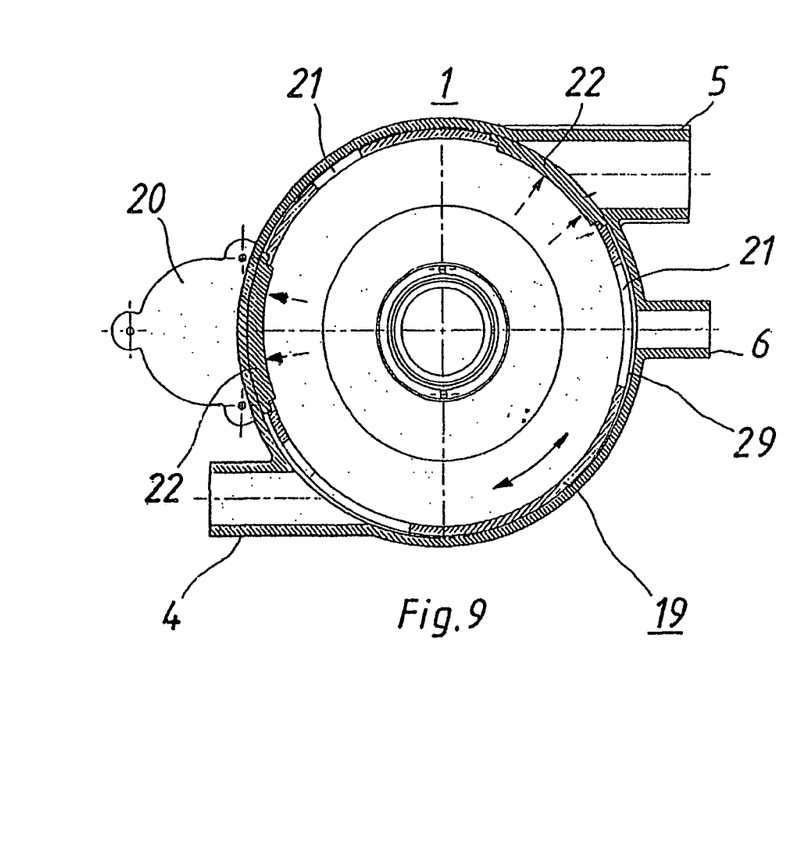
FIG. 9 the open circulation pump in a top view with the blocking element of the water diverter in a different rotational position.

The closure elements (22) are mounted in the circular blocking element (19) so that they can be moved in the radial direction, see arrows in FIGS. 3 and 9, towards the discharge port openings or towards the adjacent wall of the pressure chamber (27) and they are flow-controlled. When the circulation pump (1) is running and pumping liquid, the closure elements (22) are forced out of their valve seat (opening 28) from the inside towards the outside, thereby sealing off the discharge ports (4, 5, 6) and the adjacent pump housing wall sections as a function of the washing program selected. Between the wall of the pump chamber (27) and the parallel wall (19b) of the blocking element (19), there is a sealing gap (29) provided for the movable closure elements (22).

The sealing gap (29) also prevents the blocking element (19) of the water diverter (15) from jamming as it rotates either back and forth or only in one single direction.

The closure elements that have been moved by the pump pressure in the direction of the wall of the pressure chamber (27) additionally form leakage water sealing zones against the adjacent pump housing walls between adjacent discharge ports (4, 5, 6); see, for example, FIG. 3 or 5, so that vortexes are advantageously prevented in the pump chamber, particularly in the sealing gap (29) between the blocking element wall (19b) and the adjacent pump housing wall (27).

Figure 10:
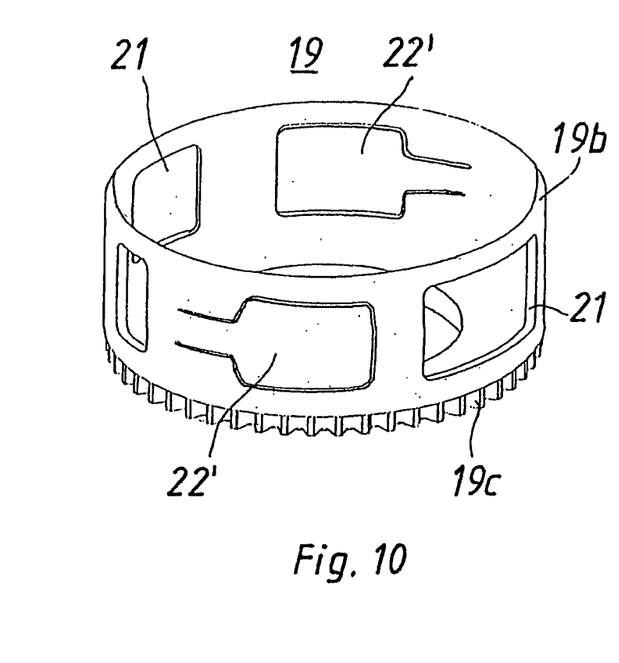
FIG. 10 the blocking element in another embodiment of the closure elements.

In order to achieve a permanent attachment to the blocking element (19), the closure elements (22) can be configured with snap-on or locking connections 42. Likewise possible is a construction in which the closure elements (22') are made in one piece together with the blocking element (19). This can be done in such a way that the closure elements (22') in the form of film hinges or the like are joined to the blocking element (19), or else the closure elements (22) are springy valve elements (22') that have been cut out of the blocking element wall (19b) as shown in FIG. 10, said elements likewise being regulated by the water pressure.

If the discharge ports in a circulation pump (1) are to be provided in an axial arrangement, contrary to the radial arrangement of the fittings on the pump housing shown here, then the diaphragm openings (21) or the closure elements (22) should be made so as to have the same effect in an appropriate axis-parallel wall of the blocking element (19), for instance, in an upper tray shaped onto the blocking element wall (19b).

The drive (20) already mentioned above in FIG. 1 for the blocking element (19) of the water diverter (15) is a mechanical device, preferably an electromechanical device having an electric motor (30) provided on the outside of the pump housing (23), optionally with gears located downstream, FIGS. 5 to 8. For this purpose, the blocking element (19) or its blocking element wall (19b) or pot bottom (19a) is provided with toothing (19c) which penetrates the pump chamber (17) and which meshes with a pinion (32) of the gears (31) outside of the pump chamber (17), FIG. 7, in a gear chamber (34) of the drive (20), said gear chamber (34) being sealed off towards the outside by means of a gasket (33). The drive axle (35) of the pinion (32) exits the pump housing (23) in a liquid-tight manner, see FIG. 8, so that it can be coupled to the electric motor (30).

Figure 7:
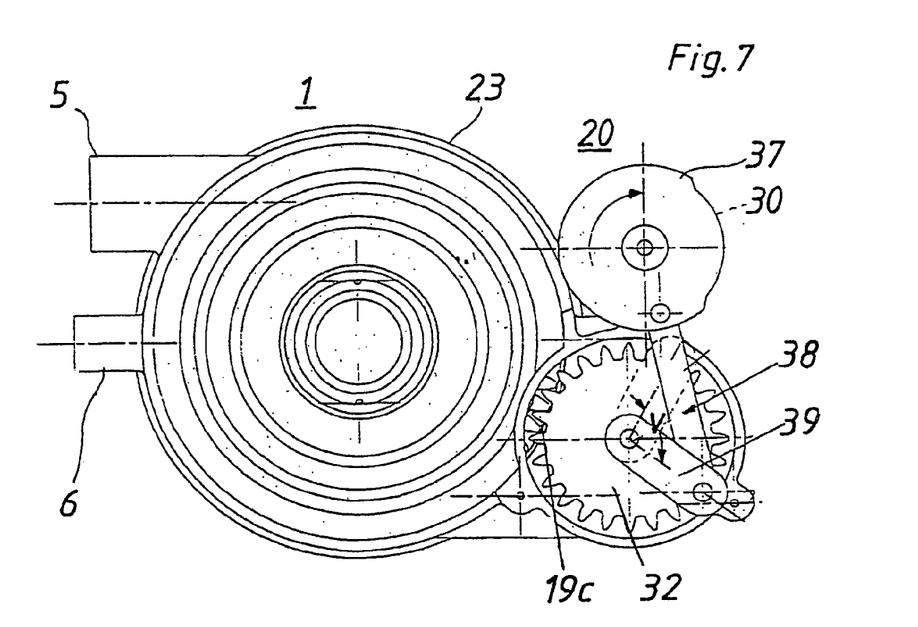
FIG. 7 the circulation pump with the integrated water diverter and with a partial section of a drive according to another embodiment, in a front view.

The reversible rotational movement of the driven blocking element (19) is effectuated by the electric motor (30), whose direction of rotation can be reversed, even though, in the case of a driving motor that only runs in one rotational direction, the reversal of the direction of rotation could also be accomplished by means of a link gear (not shown) or by means of a crank gear installed between the gears (31) and the electric motor (30), as shown in FIGS. 6 and 7. The crank gear (36) consists of a crank disk (37) that can be driven by the electric motor and that is operationally coupled to a connecting rod (38). This connecting rod (38) is rotatably attached to the drive axle (35) of the pinion (32) of the toothed gears (31).

In order to be able to detect the position of and/or to switch off the blocking element (19) at its end positions, the water diverter (15) can be provided with mechanical or electric sensors that act upon the program control of the device or the drive control. Such devices to detect the rotational position of the blocking element (19) can be realized in the form of one or more trip cams, permanent magnets or similar elements positioned on the circumference of the crank disk (37), on the pinion (32) or the like, and said elements act upon correspondingly associated switches of the actuator, either in a contact-less manner or else by means of contact, in order to control the rotational movement of the blocking element (19). The appertaining correct position of the blocking element (19) with respect to the discharge ports (4 to 6) to be opened or closed can also be reached in that the program unit of the dishwasher systematically turns the driving motor on and off, whereby an electric stepping motor, for example, can be used as the driving motor.

The blocking element (19) can also be driven hydraulically by means of the pumping medium itself. The blocking element (19) can also be made to rotate contact-less by means of magnetic force. In a practical manner, the pump motor, especially the pump impeller (24) of the circulation pump (1) could also be used as the drive (20).

Figure 8:
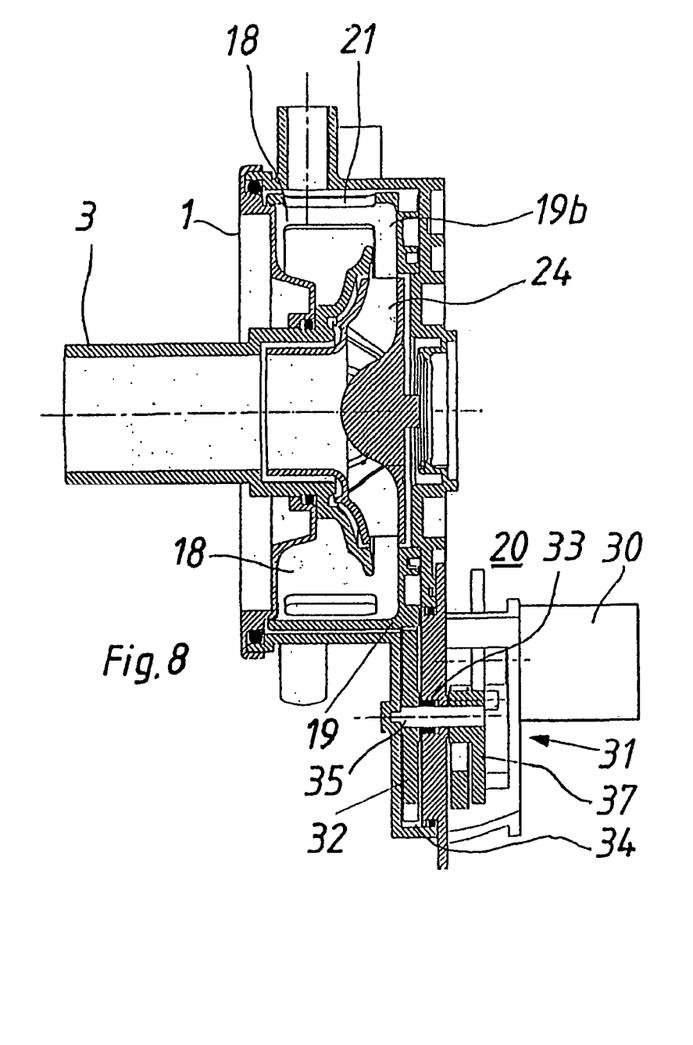
FIG. 8 the circulation pump according to FIG. 7, in a longitudinal section.

The version of the water diverter (15) with the crank gear (36) according to FIGS. 6 to 8 is advantageous since a possible jamming of the blocking element does not interfere with or impair the function of the drive, even if the system has been at a standstill for a prolonged period of time. The electric motor (30) drives the crank disk (37). The latter only turns in one direction. The connecting rod (38) moves the lever (39) back and forth by the twisting angle (V). The lever (39) is connected by the drive axle (35) to the pinion (32) located in the wet zone. This pinion, in turn, is engaged with the toothing (19c) of the blocking element (19). In this manner, the blocking element can be alternately moved to two end positions without changing the rotational direction of the driving motor (30). Owing to the kinematics of the crank drive, the adjustment torque in the area of the end positions of the blocking element is extremely high at a concurrently low load of the motor. Therefore, the crank drive described here can be used to convert the rotational movement of a gear motor into a reversing rotational movement of the blocking element. This eliminates the need for an electric motor with two rotational directions. All types of electric motor can be used. The initial breakaway torque of the blocking element is particularly high due to the crank drive, even though the motor is only under a low load.

Diverging from the described embodiment with the rotation-symmetrical or circular housing shape of the pump chamber (17), it is also conceivable and feasible to integrate the water diverter (15) into a circulation pump (1) having a pump housing (23) that is not circular in shape, such as a worm housing shape or the like. In the case of a housing whose shape is not circular, the problem arises of placing the orbiting blocking element (19) in the pressure chamber (18) exactly with a defined wall or sealing gap (29) in front of the appropriate discharge port openings. This problem can be solved, for instance, by arranging labyrinth paths—leading to the branching-off discharge ports (4 to 6)—in the pump housing (23) upstream from the discharge ports (4, 5, 6) on orbits having a shared pivoting point, whereby the blocking element (19), with its diaphragm openings (21) and/or closure elements (22), moves into these labyrinths in order to open and/or close the discharge ports.

The releasable closure elements (22) as well as the corresponding openings (28) for them are preferably configured so as to be coded in different sizes in order to prevent accidental erroneous insertion of the closure elements (22) into the blocking element (19). The geometry of the pump chamber (17) with the blocking element (19) and the cross-sectional areas of the discharge ports is selected in such a way that the pump circulates a constant volume, even when the discharge ports are adjusted; this means that, when cross-sectional areas of the discharge ports are closed, then equal sized cross-sectional openings of other discharge ports are likewise opened.

Through the installation or combination—according to the invention—of the water diverter with the circulation pump, the degree of hydraulic efficiency of the water conduits, particularly that of the circulation pump, can be improved and virtually the same design and dead volume is attained as in the case of a circulation pump without a water diverter. In particular, it is not necessary to provide additional construction space in the device, since the same piping system can be used as with a conventional pump. Due to the considerably smaller total dead volume in comparison to conventional solutions, water consumption can be significantly reduced. Especially due to the blocking element arranged in the pressure chamber of the pump upstream from the branching-off discharge ports, the number of diverter positions of the water diverter for blocking or opening the discharge ports for the washing solution can be varied in a simple manner. The blocking elements are reliably adjusted and securely fixed in place in the appertaining water diverter position by means of the drive for the blocking element located outside or inside the pressure chamber, said device being advantageously realized in the form of an electric motor and of toothed gears provided on the outside of the pump housing. A circulation or centrifugal pump configured in this manner can also be advantageously employed anywhere—in other words, outside of the realm of dishwashers and washing machines—that water conduits of a water distribution system have to be supplied with liquid, individually, alternately, or simultaneously. The circulation pumps according to the present invention can be used universally, particularly also separately in heating engineering.

What is claimed is:

1. A dishwasher comprising:
    a plurality of spray arms;
    a circulation pump including a pump housing, an impeller, a suction port, and a plurality of discharge ports on the pump housing, the discharge ports being associated with the spray arms;
    a water diverter disposed on a delivery side of the pump and configured to generate a flow leading from the suction port selectably to at least one of the discharge ports, the water diverter including a blocking element having at least one diaphragm opening positionable to at least one outlet position by a drive through a rotation of the blocking element in a circumferential direction thereof; and
    at least one movable closure element disposed opposite the at least one diaphragm opening and configured to move in a radial direction towards the pump housing by the pump pressure, and wherein the discharge ports, the at least one diaphragm opening, and the at least one closure element are arranged at least one of radially and axially relative to an axis of the circulation pump.

2. The dishwasher as recited in claim 1 wherein the water diverter is integrated with the circulation pump.

3. The dishwasher as recited in claim 1 wherein the blocking element includes at least two diaphragm openings configured to adjust a flow from the suction port to at least one of the discharge ports.

4. The dishwasher as recited in claim 1 wherein the blocking element is configured to block at least a portion of a cross-sectional area of at least one of the discharge ports so that a total open cross-sectional area of the discharge ports remains constant through a rotation of the blocking element to the at least one outlet position.

5. The dishwasher as recited in claim 1 wherein a direction of rotation of the blocking element is reversible.

6. The dishwasher as recited in claim 1 wherein the circulation pump includes a pump chamber encircling the impeller in the form of a cylinder, the water diverter being disposed in the pump chamber.

7. The dishwasher as recited in claim 1 further comprising a heater and wherein the circulation pump includes a pump chamber encircling the impeller in the form of a cylinder, the pump chamber being divided into a flow-intensive impeller chamber, a vaneless ring diffuser chamber disposed downstream from the impeller chamber, and a flow-steadied pressure chamber disposed downstream from the diffuser chamber, the discharge ports branching off from the pressure chamber, the blocking element and the heater being disposed in the pressure chamber.

8. The dishwasher as recited in claim 1 further comprising at least one movable closure element disposed opposite the at least one diaphragm opening and configured to move in a radial direction towards the pump housing by the pump pressure, and wherein:
   the circulation pump includes a pump chamber encircling the impeller in the form of a circular cylinder, the pump chamber being divided into a flow-intensive impeller chamber, a vaneless ring diffuser chamber disposed downstream from the impeller chamber, and a flow-steadied pressure chamber disposed downstream from the diffuser chamber; and
   the blocking element includes a cylindrical wall matching a shape of the pump chamber and disposed substantially form-fittingly in the pressure chamber so as to form a sealing gap for the at least one movable closure element between an inner wall of the pump chamber and the cylindrical blocking portion.

9. The dishwasher as recited in claim 1 wherein the blocking element is shaped like a pot with a bottom.

10. The dishwasher as recited in claim 1 wherein the blocking element is shaped like a cylindrical ring without a bottom.

11. The dishwasher as recited in claim 1 further comprising at least one movable closure element disposed opposite the at least one diaphragm opening and configured to move in a radial direction towards the pump housing by the pump pressure, each of the at least one movable closure element being configured as a loose part separately form-fittingly insertable into a respective opening in the blocking element.

12. The dishwasher as recited in claim 1 further comprising at least one movable closure element disposed opposite the at least one diaphragm opening and configured to move in a radial direction towards the pump housing by the pump pressure, the at least one movable closure element having a snap-on or locking connection for attachment to the blocking element.

13. The dishwasher as recited in claim 1 further comprising at least one movable closure element disposed opposite the at least one diaphragm opening and configured to move in a radial direction towards the pump housing by the pump pressure, the at least one closure element being integral with the blocking element.

14. The dishwasher as recited in claim 1 further comprising at least one movable closure element disposed opposite the at least one diaphragm opening and configured to move in a radial direction towards the pump housing by the pump pressure, the at least one closure element including a film hinge joined to the blocking element.

15. The dishwasher as recited in claim 1 further comprising at least one movable closure element disposed opposite the at least one diaphragm opening and configured to move in a radial direction towards the pump housing by the pump pressure, the at least one closure element including a springy valve element integral with the blocking element and cut out of a wall of the blocking element.

16. The dishwasher as recited in claim 1 wherein the drive includes an electric motor disposed on the pump housing and configured to move the blocking element.

17. The dishwasher as recited in claim 16 wherein the drive includes gears disposed downstream of the electric motor.

18. The dishwasher as recited in claim 17 wherein the circulation pump includes a pump chamber encircling the impeller in the form of a cylinder, the drive includes a gear chamber sealed off towards an outside, and the blocking element includes toothing penetrating the pump chamber and meshing with a pinion of the gears outside of the pump chamber in the gear chamber, a drive axle of the pinion extending from the pump housing in a liquid-tight manner so as to be coupled to the electric motor.

19. The dishwasher as recited in claim 17 further comprising a connecting rod rotatably attached to a drive axle of the pinion and further comprising a crank gear disposed between the gears and the electric motor and configured to cause the rotation of the blocking element, the crank gear including a crank disk drivable by the electric motor and operatively coupled to the connecting rod.

20. The dishwasher as recited in claim 1 wherein the water diverter includes a position detection device configured to at least one of mechanically and electrically detect a position of the blocking element.

21. The dishwasher as recited in claim 1 wherein the water diverter includes a switch device configured to switch off the blocking element at an end position thereof.

22. The dishwasher as recited in claim 1 further comprising at least one detection element configured to detect a rotational position of the blocking element by acting on a switch device in at least one of a contactless and a by-contact manner so as to control the rotation of the blocking element, the at least one detection element including at least one of a trip cam and a magnet.

23. The dishwasher as recited in claim 19 further comprising at least one detection element configured to detect a rotational position of the blocking element by acting on a switch device so as to control the rotation of the blocking element, the at least one detection element being disposed on at least one of the pinion and a circumference of the crank disk.

* * * * *